(12) United States Patent
Suzuki

(10) Patent No.: US 7,384,358 B2
(45) Date of Patent: Jun. 10, 2008

(54) AUTOMATIC TRANSMISSION CONTROL APPARATUS

(75) Inventor: Fuminori Suzuki, Okazaki (JP)

(73) Assignee: Denso Corporation (JP)

( * ) Notice: Subject to any disclaimer, the term of this patent is extended or adjusted under 35 U.S.C. 154(b) by 287 days.

(21) Appl. No.: 11/397,567

(22) Filed: Apr. 5, 2006

(65) Prior Publication Data

US 2006/0247084 A1 Nov. 2, 2006

(30) Foreign Application Priority Data

Apr. 7, 2005 (JP) ............................. 2005-110736

(51) Int. Cl.
*F16H 31/00* (2006.01)
(52) U.S. Cl. .................................... 475/127
(58) Field of Classification Search ................ 475/127, 475/116
See application file for complete search history.

(56) References Cited

U.S. PATENT DOCUMENTS 5,527,236 A 6/1996 Kimura et al.
7,104,925 B2* 9/2006 Takagi ......................... 477/156
7,306,543 B2* 12/2007 Honda et al. ................ 477/160

FOREIGN PATENT DOCUMENTS

| JP | 05-296327 | 11/1993 |
|---|---|---|
| JP | 09-042434 | 2/1997 |

\* cited by examiner

*Primary Examiner*—Dirk Wright
(74) *Attorney, Agent, or Firm*—Nixon & Vanderhye PC

(57) ABSTRACT

Each corresponding one of a plurality of friction arrangements, which is driven in an engaging direction to achieve engagement at time of next gear shift to transmit torque, is selected as a standby friction arrangement that is placed in a standby state for implementing the next gear shift. A standby oil pressure for sliding each corresponding one of the plurality of drive pistons, which drives the corresponding standby friction arrangement, is applied to the corresponding drive piston within a range that does not cause transmission of the torque through the corresponding standby friction arrangement before the next gear shift.

7 Claims, 6 Drawing Sheets

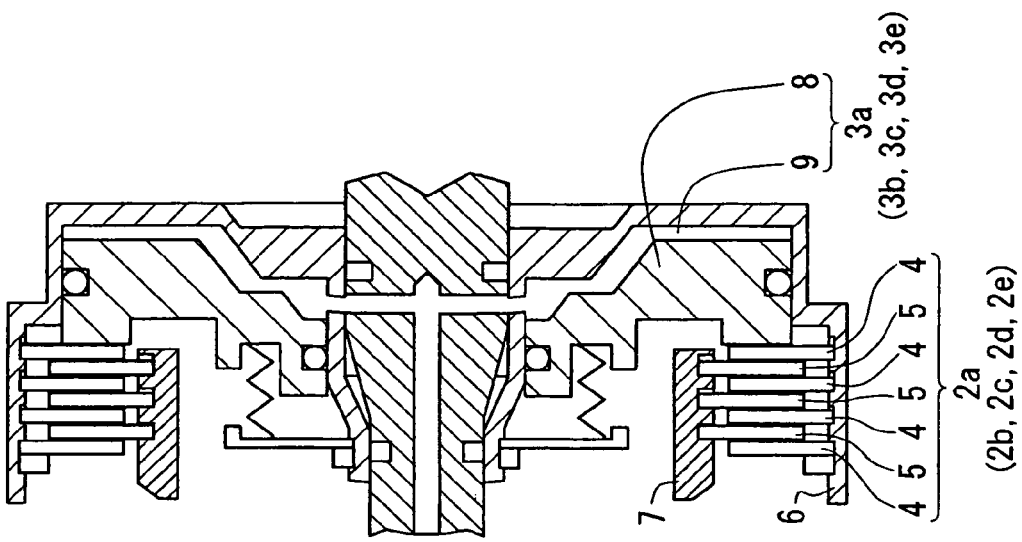
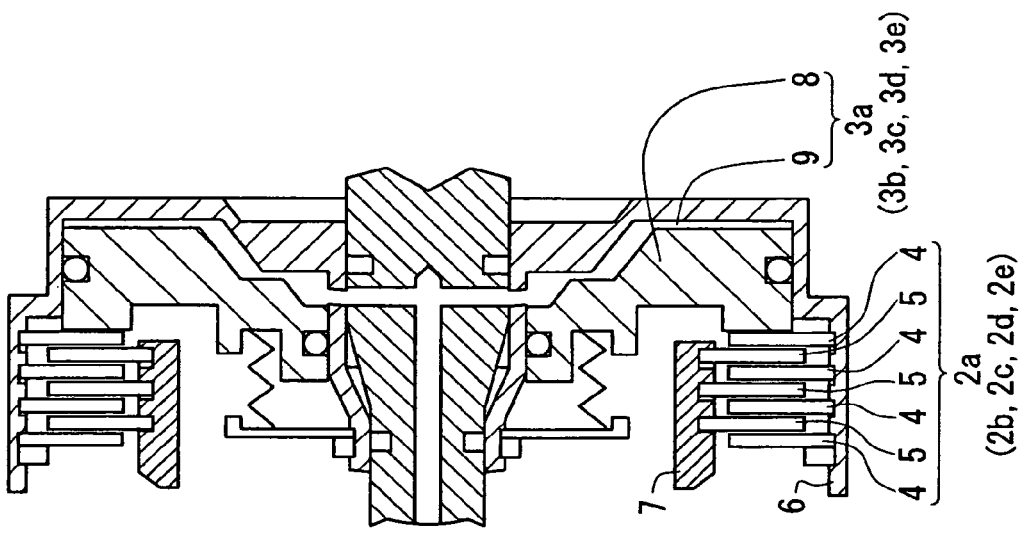
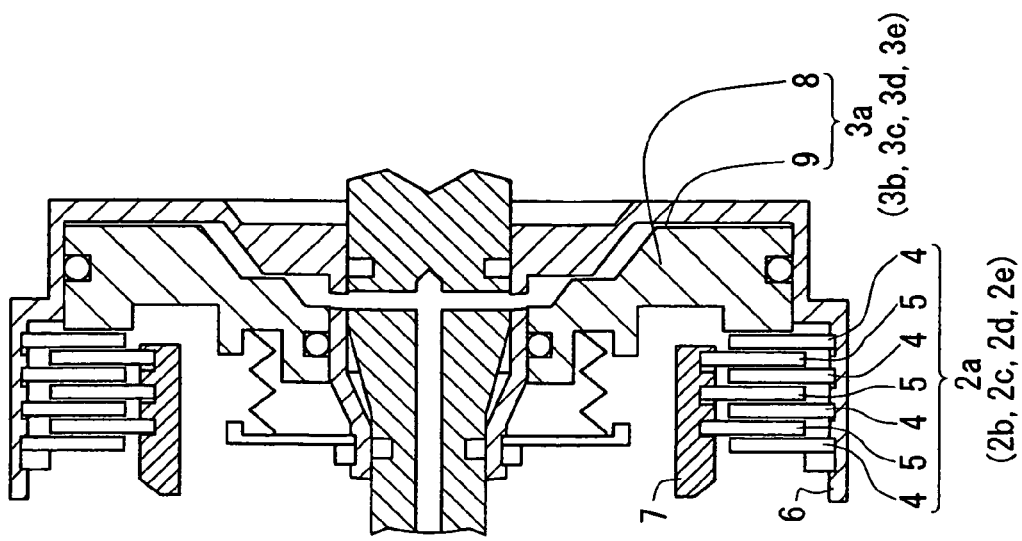

| RANGE / SPEED RATIO | | FRICTION ARR. 2a | FRICTION ARR. 2b | FRICTION ARR. 2c | FRICTION ARR. 2d | FRICTION ARR. 2e |
|---|---|---|---|---|---|---|
| P | | | | | | |
| R | | | | | ○ | ○ |
| N | | | | | | |
| D | 1st | ○ | | ○ | | |
| | 2nd | ○ | | | | |
| | 3rd | ○ | | | | ○ |
| | 4th | ○ | ○ | | | |
| | 5th | | ○ | | | ○ |
| | 6th | | ○ | ○ | | |

AUTOMATIC TRANSMISSION CONTROL APPARATUS

CROSS REFERENCE TO RELATED APPLICATION

This application is based on and incorporates herein by reference Japanese Patent Application No. 2005-110736 filed on Apr. 7, 2005.

BACKGROUND OF THE INVENTION

1. Field of the Invention

The present invention relates to an automatic transmission control apparatus, which controls engagement and disengagement of each corresponding one of a plurality of friction arrangements of an automatic transmission of a vehicle by controlling application of a fluid pressure of operating fluid to a corresponding one of a plurality of drive pistons, which are assigned to and drive the plurality of friction arrangements, respectively.

2. Description of Related Art

In the automatic transmission control apparatus of the above type that controls the fluid pressure, a piston chamber, which applies the fluid pressure to the drive piston assigned to the corresponding friction arrangement (e.g., a clutch or a brake), is emptied in a disengaged state of the friction arrangement. In this state, when gear shift, which causes the engagement of the friction arrangement, needs to be performed, the operating fluid is supplied in the piston chamber to stroke, i.e., slide the piston. However, in this instance, the piston cannot be slid until the working fluid is filled in the piston chamber. Therefore, the engagement of the friction arrangement disadvantageously requires a relatively long period of time. In order to address the above disadvantage, a rate of increase in the applied fluid pressure per unit time may be increased to shorten the time required for achieving the engagement of the friction arrangement. However, in such a case, a gear shift shock is increased to cause deterioration in the gear shift feeling of an occupant of the vehicle.

Japanese Unexamined Patent Publication No. H05-296327 addresses the above disadvantage by providing a control apparatus that applies an oil pressure to the clutch in a very little level that does not cause the slide movement of the piston before the gear shift takes place. That is, in this control apparatus, the piston chamber can be filled with the operating oil before the next gear shift takes place. Thus, the time required for the engagement of the clutch can be shortened without rapidly increasing the oil pressure applied to the piston.

However, in the control apparatus of Japanese Unexamined Patent Publication No. H05-296327, the oil pressure, which is applied to the piston before the next gear shift, is made relatively small level that does not cause the slide movement of the piston. Thus, there is still required substantial time between the initiation of the actual gear shift and implementation of torque transmission upon engagement of the clutch due to the required substantial slide movement of the piston. Thus, there is the limitation on the shortening of the time required for the engagement and thereby on the shortening of the gear shift. As a result, a recent market demand of achieving high gear shift response cannot be met, and thereby the good gear shift feeling of the occupant cannot be made.

The present invention addresses the above disadvantages. Thus, it is an objective of the present invention to provide an automatic transmission control apparatus, which provides improved gear shift feeling.

To achieve the objective of the present invention, there is provided an automatic transmission control apparatus, which controls engagement and disengagement of each corresponding one of a plurality of friction arrangements of an automatic transmission of a vehicle by controlling application of a fluid pressure of operating fluid to a corresponding one of a plurality of drive pistons, which are assigned to and drive the plurality of friction arrangements, respectively. The automatic transmission control apparatus includes a selecting means and an applying means. The selecting means is for selecting each corresponding one of the plurality of friction arrangements, which is driven in an engaging direction to achieve the engagement at time of next gear shift to transmit torque, as a standby friction arrangement that is placed in a standby state for implementing the next gear shift. The applying means is for applying a standby fluid pressure to each corresponding one of the plurality of drive pistons, which drives the corresponding standby friction arrangement, before the next gear shift. The standby fluid pressure is for sliding each corresponding one of the plurality of drive pistons, which drives the corresponding standby friction arrangement, within a range that does not cause transmission of the torque through the corresponding standby friction arrangement.

BRIEF DESCRIPTION OF THE DRAWINGS

The invention, together with additional objectives, features and advantages thereof, will be best understood from the following description, the appended claims and the accompanying drawings in which:

FIG. 3A is a schematic cross sectional view showing the automatic transmission in one operational state;

FIG. 3B is a schematic cross sectional view showing the automatic transmission in another operational state;

FIG. 3C is a schematic cross sectional view showing the automatic transmission in another operational state;

DETAILED DESCRIPTION OF THE INVENTION

Figure 2:
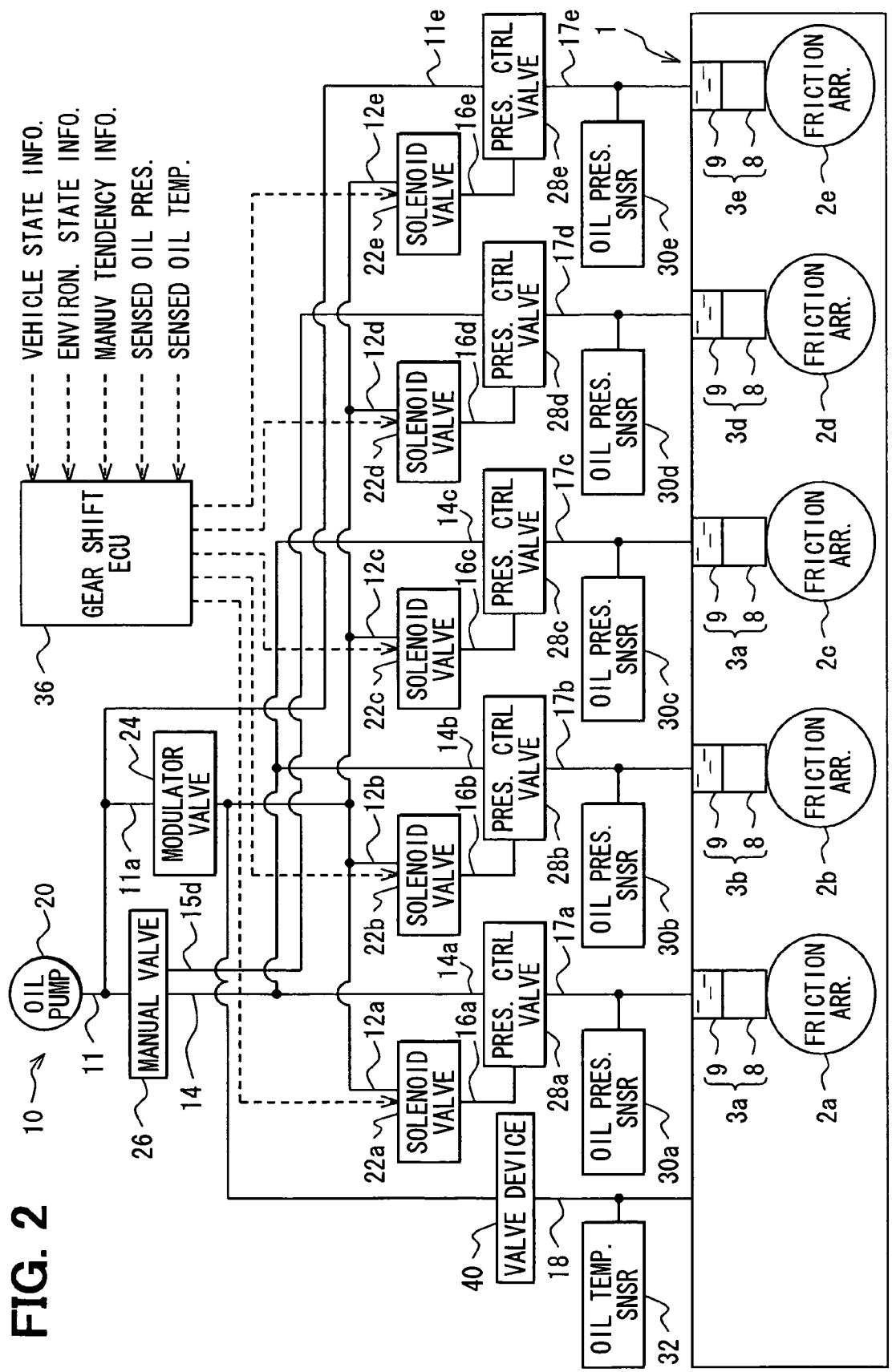
FIG. 2 is a block diagram showing an automatic transmission control apparatus according to the embodiment.

FIG. 2 is a block diagram showing an automatic transmission (AT) control apparatus 10 according to an embodiment of the present invention. The AT control apparatus 10 is installed in a vehicle as a control apparatus of an automatic transmission (AT) 1 that has a steering-wheel shift switch (in a form of, for example, buttons or puddles)

provided in a steering wheel of the vehicle. The AT 1 having the steering-wheel shift switch is an automatic transmission, which enables selection between a steering-wheel shift mode and a normal mode. In the steering-wheel shift mode, upshift and downshift of the transmission are controlled through the steering-wheel shift switch. In the normal mode, the upshift and downshift of the transmission are automatically performed independent of the operation of the steering-wheel shift switch.

Figure 1:
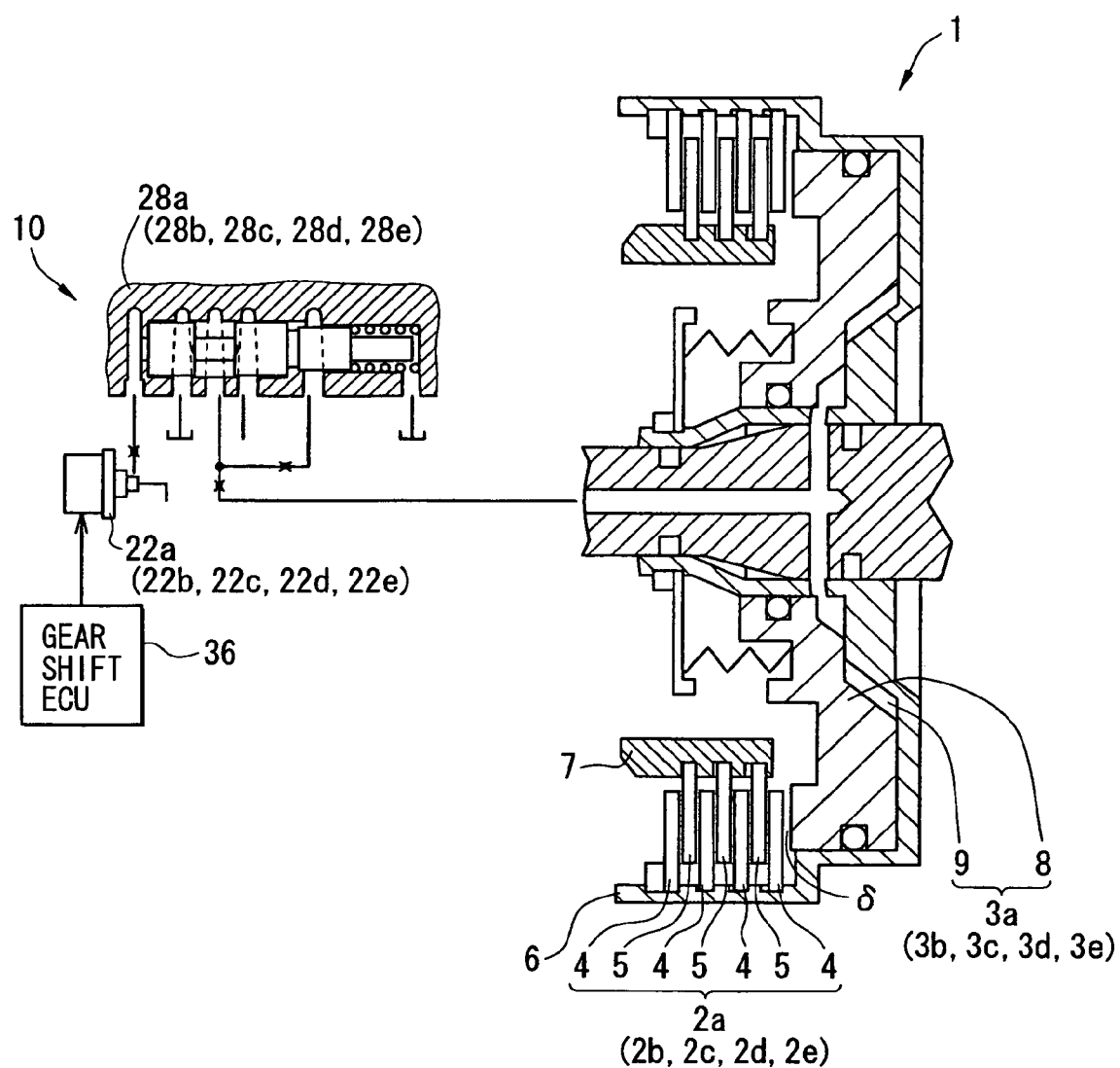
FIG. 1 is a schematic cross sectional view showing a main feature of an automatic transmission according to an embodiment of the present invention.

First, the AT 1 will be described in detail. The AT 1 includes a plurality of friction arrangements 2a-2e and a plurality of drive arrangements 3a-3e. The friction arrangements 2a-2e correspond to and are driven by the drive arrangements 3a-3e, respectively. Each of the friction arrangements 2a-2e is a clutch or a brake and includes, for example, a plurality of input friction plates 4 and a plurality of output friction plates 5, as shown in FIG. 1. A torque is supplied from an engine of the vehicle to an input shaft 6, and the input friction plates 4 are installed to the input shaft 6 in such a manner that the input friction plates 4 are displaceable in an axial direction (a left-right direction in FIG. 1). The torque is outputted from an output shaft 7 to drive vehicle wheels, and the output friction plates 5 are installed to the output shaft 7 in such a manner that the output friction plates 5 are displaceable in the axial direction. The friction plates 4 and the friction plates 5 are frictionally engageable with one another to transmit the torque of the input shaft 6 to the output shaft 7 while being lubricated by operating oil supplied from the AT control apparatus 10. Each drive arrangement 3a-3e includes a piston 8 and a piston chamber 9. An internal pressure of the operating oil, which is supplied from the AT control apparatus 10 to the piston chamber 9, is applied to the piston 8. The piston 8 strokes, i.e., slides in the axial direction in response to the applied oil pressure.

As shown in FIG. 1, in each drive arrangement 3a-3e, when the operating oil is not filled in the piston chamber 9, the piston 8 does not slide, so that a space δ is provided between the piston 8 and the closest input friction plate 4 of the friction arrangement 2a-2e, which is closest to the piston 8. At this time, the input friction plates 4 and the output friction plates 5 are spaced from one another, so that the friction arrangements 2a-2e are placed in a released state, i.e., a disengaged state, in which the torque transmission from the input shaft 6 to the output shaft 7 is stopped, i.e., is disabled.

In each drive arrangement 3a-3e, when the operating oil is filled in the piston chamber 9 to cause an increase in the internal pressure of the operating oil, i.e., the oil pressure applied to the piston 8, the piston 8 initiates its slide movement toward the input friction plate 4, as shown in FIG. 3A.

In each drive arrangement 3a-3e, as shown in FIG. 3B, when the piston 8 slides by an amount equal to a size of the space δ, the piston 8 contacts the closest input friction plate 4, so that the piston 8 is placed in engagement with the closest input friction plate 4.

In each drive arrangement 3a-3e, when the oil pressure, which is applied to the piston 8 that is in engagement with the closest input friction plate 4, is increased, the piston 8 pushes the corresponding friction arrangement 2a-2e and resumes its slide movement, as shown in FIG. 3C. As a result, the input friction plates 4 and the output friction plates 5 are frictionally engaged with one another, so that the friction arrangement 2a-2e is placed in a fully engaged state, in which the torque is transmitted from the input shaft 6 to the output shaft 7.

Figures 4, 7:
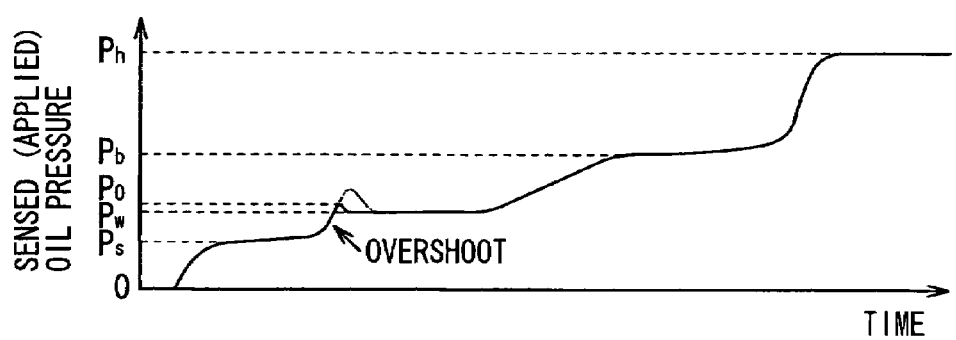
FIG. 4 is a schematic diagram for describing an operation of the automatic transmission according to the embodiment.
FIG. 7 is a characteristic diagram for describing the gear shift control operation of the automatic transmission control apparatus according to the embodiment.

In the AT 1, there are provided a park (P) range, a neutral (N) range, a drive (D) range and a reverse (R) range. The P range and the N range are non-driving range, and the D range is the forward driving range. Furthermore, in the AT 1, the D range has six forward speed ratios (1st to 6th speeds). As shown in FIG. 4, these ranges and speed ratios of the AT 1 can be changed from one to another by changing a combination of the engagement(s) and disengagement(s) of the friction arrangements 2a-2e. In FIG. 4, each circle indicates the corresponding friction arrangement, which is placed in the full engagement at the time of implementing the corresponding range and/or speed ratio.

Next, the AT control apparatus 10 will be described in detail. As shown in FIG. 2, the AT control apparatus 10 includes an oil pump 20, solenoid valves 22a-22e, a modulator valve 24, a manual valve 26, pressure control valves 28a-28e, oil pressure sensors 30a-30e, an oil temperature sensor 32 and a gear shift electronic control unit (ECU) 36.

The oil pump 20 is a mechanical or electric pump and is connected to an oil passage 11 and an oil pan (not shown). The oil pump 20 generates a line pressure by drawing the operating oil from the oil pan and discharging the pressurized operating oil into the oil passage 11.

The solenoid valves 22a-22e are electrically connected to the common gear shift ECU 36. Each solenoid valve 22a-22e adjusts a command oil pressure to a corresponding oil pressure, which is proportional to a command value that is supplied from the gear shift ECU 36. Then, the adjusted command oil pressure is outputted from the solenoid valve 22a-22e. Here, the supplied command value is in a form of, for example, a command duty ratio, a command electric current. The modulator valve 24 is connected to an oil passage 11a, which is branched from the oil passage 11, and is also connected to the solenoid valves 22a-22e through oil passages 12a-12e, respectively. The modulator valve 24 adjusts an initial pressure, which is adjusted to the command pressure by the respective solenoid valve 22a-22e, to a modulated pressure, which is lower than the line pressure.

The manual valve 26 is a spool valve, which is mechanically or electrically driven in response to an operation of a shift lever of the vehicle and is connected to the oil passages 11, 14, 15d. The manual valve 26 connects the oil passage 11 to the oil passage 14 and/or the oil passage 15d depending on the selected range, which is selected through the shift lever. Specifically, when the P range or the N range is selected through the shift lever, the manual valve 26 disconnects both of the oil passage 14 and the oil passage 15 from the oil passage 11. When the D range is selected, the manual valve 26 connects only the oil passage 14 to the oil passage 11 to supply the line pressure of the oil passage 11 to the oil passage 14. When the R range is selected, the manual valve 26 connects only the oil passage 15d to the oil passage 11 to supply the line pressure of the oil passage 11 to the oil passage 15d.

The pressure control valves 28a-28c are connected to the oil passages 14a-14c, respectively, which are branched from the oil passage 14. Furthermore, the pressure control valve 28d is connected to the oil passage 15d, and the pressure control valve 28e is connected to an oil passage 11e, which is branched from the oil passage 11. The pressure control valves 28a-28e are connected to the solenoid valves 22a-22e, respectively, through oil passages 16a-16e and are also connected to the piston chambers 9, respectively, of the drive arrangements 3a-3e through oil passages 17a-17e. Each pressure control valve 28a-28e uses the oil pressure of the corresponding oil passage 14a-14c, 15d, 11e as its initial pressure and adjusts the oil pressure, which is applied to the piston 8 of the corresponding drive arrangement 3a-3e, to a corresponding oil pressure, which is proportional to the command pressure that is supplied from the corresponding solenoid valve 22a-22e. In the present embodiment, in order to sense a phenomenon known as overshoot described below, it is desirable to eliminate a damper, which limits oil pressure pulsation (oil pressure surge), in the oil passages 17a-17e between the pressure control valves 28a-28e and the drive arrangements 3a-3e and also in the oil passages 16a-16e between the pressure control valves 28a-28e and the corresponding solenoid valves 22a-22e.

The oil pressure sensors 30a-30e are connected to the oil passages 17a-17e and are electrically connected to the common gear shift ECU 36. Each oil pressure sensor 30a-30e senses the oil pressure, which is applied to the piston 8 of the corresponding drive arrangement 3a-3e provided on a downstream side of the corresponding pressure control valve 28a-28e, which is provided on an upstream side of the corresponding oil passage 17a-17e. Then, each oil pressure sensor 30a-30e outputs a measurement signal, which indicates the corresponding measured oil pressure, to the gear shift ECU 36.

The oil temperature sensor 32 is connected to an oil passage 18, which supplies the operating oil to the AT 1 as the lubricant oil for lubricating the friction arrangements 2a-2e. The oil temperature sensor 32 is also electrically connected to the gear shift ECU 36. The oil temperature sensor 32 senses the temperature of the lubricant oil of the friction arrangements 2a-2e and outputs a measurement signal, which indicates the measured oil temperature, to the gear shift ECU 36. A valve device 40, which adjusts an amount of lubricant oil supply to the AT 1, is arranged in the oil passage 18.

The gear shift ECU 36 includes a microcomputer as its main component. A CPU of the gear shift ECU 36 executes a control program stored in a memory of the gear shift ECU 36 to determine an input command value supplied to the solenoid valves 22a-22e based on the measured oil pressure of each oil pressure sensor 30a-30e, the measured oil temperature of the oil temperature sensor 32 and the other vehicle related information. The vehicle related information includes vehicle state information, environmental state information and vehicle maneuver tendency information. The vehicle state information indicates a state of the vehicle. The environmental state information indicates a state of a drive environment of the vehicle. The vehicle maneuver tendency information indicates the vehicle maneuver tendency of the driver of the vehicle. Specifically, in the present embodiment, the range and the speed ratio of the At 1 and the vehicle speed are used as the vehicle state information. Furthermore, road information about a currently traveling road and a predicted travel path (a travel path, along which the vehicle is expected to travel) is used as the environmental state information. In addition, a history of accelerator operating tendency of the driver is used as the vehicle maneuver tendency information. Here, the corresponding range of the AT 1 may be determined by, for example, sensing a selected range that is selected through operation of the shift lever. Alternatively, the corresponding range of the AT 1 may be determined based on a sensed oil pressure of each oil pressure sensor 30a-30e. The corresponding speed ratio of the AT 1 may be computed based on, for example, the sensed oil pressure of each oil pressure sensor 30a-30e. Alternatively, the speed ratio of the AT 1 may be determined by sensing a selected speed ratio, which is selected through the steering-wheel shift switch of the vehicle in a case where the steering-wheel shift operation is enabled. The vehicle speed may be computed based on, for example, a measurement of a rotational speed of the vehicle wheel. The road information may be obtained through, for example, a navigation system installed in the vehicle. In a case where the road information indicates the state of the currently traveling road, the road information may be one, which is sensed through, for example, the wheel rotational speed and a gyro angle. The accelerator operating tendency may be obtained through, for example, a learning operation, in which an accelerator opening degree, i.e., an amount of depression of an accelerator pedal (an accelerator operational amount) is learned one after another to obtain a history of the accelerator operational amount through a predetermined corresponding ECU.

As discussed above, each command pressure, which is supplied from the corresponding solenoid valve 22a-22e to the corresponding pressure control valve 28a-28e, is adjusted based on the corresponding input command value, which is determined by the gear shift ECU 36 and is supplied to the corresponding solenoid valve 22a-22e. Thus, the oil pressure, which is applied from the pressure control valve 28a-28e to the piston 8 of the corresponding drive arrangement 3a-3e, is changed based on the input command value supplied to the corresponding solenoid valve 22a-22e. Thus, the gear shift ECU 36 can control the oil pressure, which is applied to the piston 8 of each corresponding drive arrangement 3a-3e.

A gear shift control process of the AT control apparatus 10 will be described with reference to FIGS. 5 and 6. The gear shift control process is initiated every time the engine is cranked or every time each gear shift operation is ended.

Figure 5:
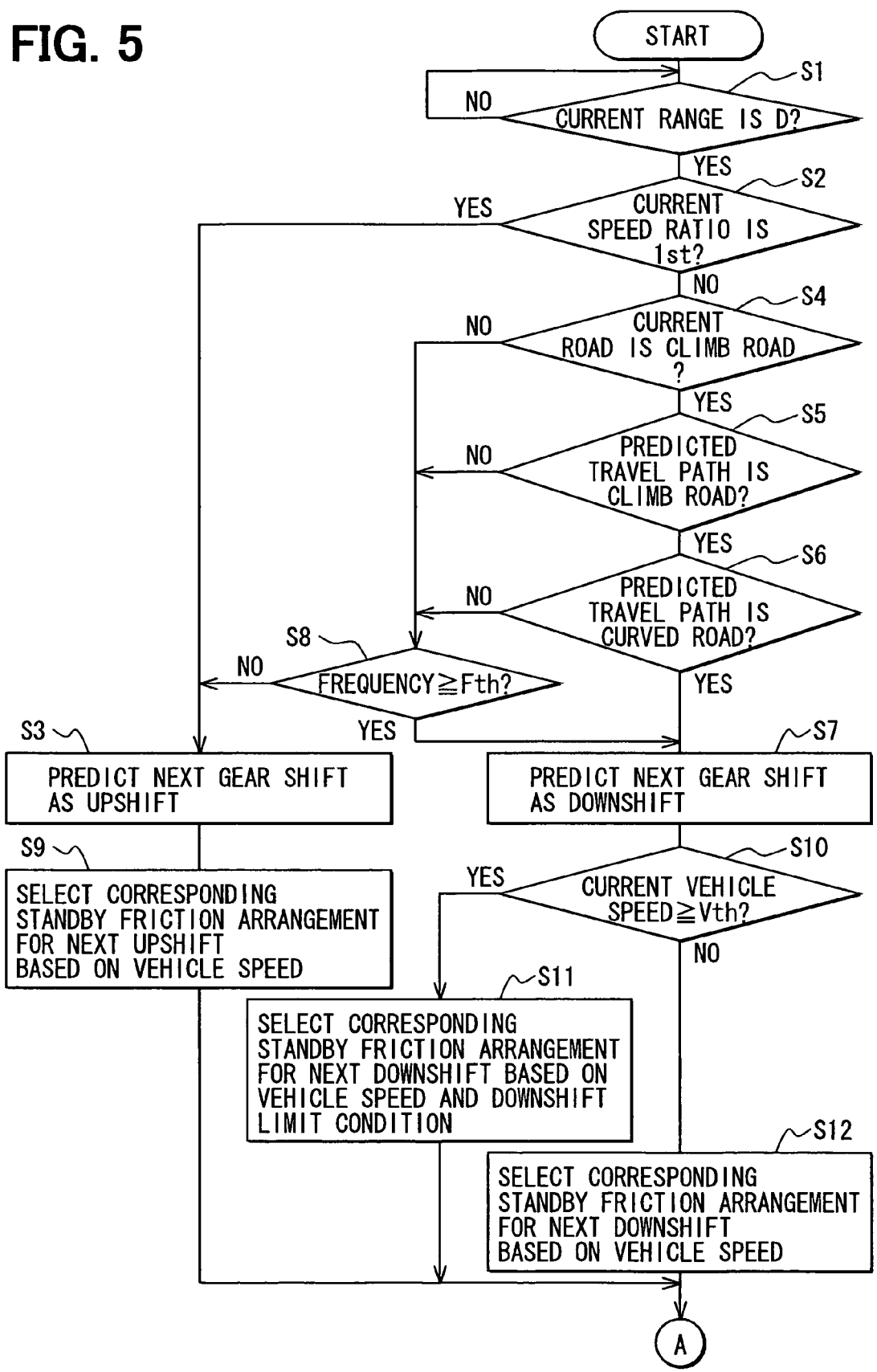
FIG. 5 is a flowchart showing a portion of a gear shift control operation of the automatic transmission control apparatus according to the embodiment.

After starting the gear shift control process, at step S1 of FIG. 5, the gear shift ECU 36 determines whether the currently selected range, which is selected through the shift lever, is the D range. When YES is returned at step S1, the gear shift ECU 36 proceeds to step S2 and determines whether the current speed ratio is the 1st speed.

When YES is returned at step S2, the gear shift ECU 36 proceeds to step S3 and predicts that the next gear shift will be upshift from the current speed ratio. Then, the gear shift ECU 36 proceeds to step S9.

When NO is returned at step S2, the gear shift ECU 36 proceeds to step S4. At step S4, the gear shift ECU 36 determines whether the currently traveling road is a climb road. When YES is returned at step S4, the gear shift ECU 36 proceeds to step S5 and determines whether the predicted travel path (specifically, a portion of the drive path that lies ahead of the currently traveling road) is a climb road. When YES is returned at step S5, the gear shift ECU 36 proceeds to step S6 and determines whether the predicted travel path (specifically, the portion of the drive path that lies ahead of the currently traveling road) is a curved road.

When YES is returned at step S6, the gear shift ECU 36 proceeds to step S7 and predicts that the next gear shift will be downshift from the current speed ratio. Then, the gear shift ECU 36 proceeds to step S10.

In contrast, when NO is returned at any one of steps S4-S6, the gear shift ECU 36 proceeds to step S8 and determines whether a frequency of achieving a large amount of change in the accelerator operational amount (e.g., a frequency of exceeding a predetermined value) is equal to or greater than a reference frequency Fth by referring the history of the accelerator operating tendency. Here, the reference frequency Fth is set to be a minimum value in a frequency range that is obtained under a control condition, which is set mainly for the downshift, by counting the frequency of achieving the large amount of change in the accelerator operational amount.

When NO is returned at step S8, the gear shift ECU 36 proceeds to step S3 and predicts that the next gear shift is the upshift. Then, the gear shift ECU 36 proceeds to step S9.

When YES is returned at step S8, the gear shift ECU 36 proceeds to step S7 and predicts that the next gear shift is the downshift. Then, the gear shift ECU 36 proceeds to step S10.

At step S9, which is executed after step S3 where the upshift is predicted, the gear shift ECU 36 selects each corresponding standby friction arrangement, which will be placed in a standby state for implementing the next. upcoming upshift and will be used in the next upcoming upshift, from the friction arrangements 2a-2e based on the current vehicle speed. Thereafter, the gear shift ECU 36 proceeds to step S13.

At step S10, which is executed after step S7 where the downshift is predicted, the gear shift ECU 36 determines whether the current vehicle speed is equal to or greater than a downshift limit speed Vth. The downshift limit speed Vth is set to be a minimum value in a corresponding vehicle speed range, in which downshift that causes large gear skipping should be limited to limit wheelspin of the vehicle wheels induced by the downshift from the current speed ratio.

In a case where YES is returned at step S10, the gear shift ECU 36 proceeds to step S11 and selects each corresponding standby friction arrangement 2a-2e, which will be placed in a standby state for implementing the next upcoming downshift and will be used in the next upcoming downshift, from the friction arrangements 2a-2e based on the current vehicle speed and the downshift limit condition. The downshift limit condition limits the number of the shiftable speed ratio(s) in the downshift to limit the wheelspin caused by the downshift from the current speed ratio and is previously stored in the memory of the gear shift ECU 36. After the selection of each corresponding standby friction arrangement, the gear shift ECU 36 proceeds to step S13.

In a case where NO is returned at step S10, the gear shift ECU 36 proceeds to step S12 and selects each corresponding standby friction arrangement, which will be placed in the standby state and will be used in the next upcoming downshift, from the friction arrangements 2a-2e based on the current vehicle speed. Thereafter, the gear shift ECU 36 proceeds to step S13.

Figure 6:
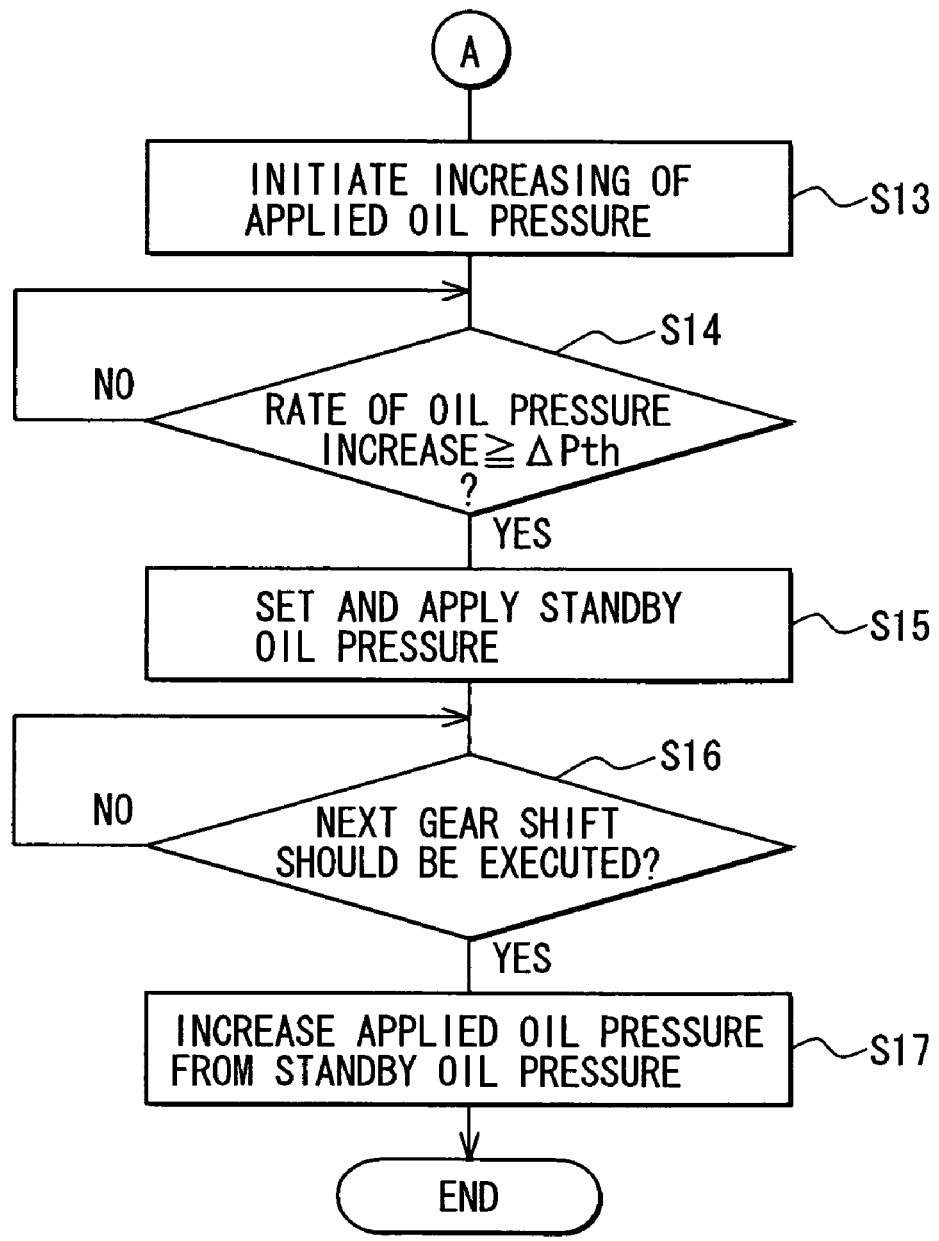
FIG. 6 is a flowchart showing another portion of the gear shift control operation of the automatic transmission control apparatus according to the embodiment.

At step S13 of FIG. 6, which is executed after the selection of each corresponding standby friction arrangement at each of step S9, step S11 and step S12, the gear shift ECU 36 initiates increasing of the oil pressure applied to the drive piston 8 of each corresponding standby friction arrangement. In this way, the operating oil is filled in each corresponding piston chamber 9, which applies the oil pressure to the corresponding drive piston 8. Thus, the corresponding piston 8 initiates its stroke, i.e., its slide movement, as shown in FIG. 3A. Here, the applied oil pressure at the time of initiating the stroke (the slide movement) will be referred to as a stroke start oil pressure Ps.

In the following step S14, the gear shift ECU 36 monitors the oil pressure, which is sensed by each corresponding oil pressure sensor that corresponds to the drive piston 8 assigned to the corresponding standby friction arrangement, and the gear shift ECU 36 determines whether a rate of increase in the oil pressure per unit time (i.e., an amount of increase in the oil pressure per unit time) becomes equal to or greater than a threshold value ΔPth. Here, as shown in FIG. 3B, when each corresponding drive piston 8, which is assigned to the corresponding standby friction arrangement, engages the closest input friction plate 4 of the corresponding standby friction arrangement, the sensed oil pressure shows the phenomenon known as the overshoot (hereinafter, referred to as an overshoot phenomenon), as shown in FIG. 7. Thus, the required rate of increase in the oil pressure per unit time, which is required to sense the overshoot phenomenon, is set as the threshold value ΔPth.

When YES is returned at step S14, the gear shift ECU 36 proceeds to step S15 and sets a standby oil pressure Pw. The standby oil pressure Pw is an oil pressure that is continuously applied to each corresponding drive piston 8 assigned to the corresponding standby friction arrangement until initiation of the next gear shift. Specifically, the sensed oil pressure, which is sensed by each corresponding oil pressure sensor that corresponds to the drive piston 8 assigned to the corresponding standby friction arrangement, at the time of starting the current step is set as a corresponding reference oil pressure P0 by the gear shift ECU 36. Next, based on the sensed oil temperature sensed by the oil temperature sensor 32, the gear shift ECU 36 corrects the reference oil pressure P0 to an oil pressure that is higher than the stroke start oil pressure Ps but is lower than a full engagement oil pressure Pb. The full engagement oil pressure Pb is a pressure that enables the torque transmission through the corresponding standby friction arrangement in the fully engaged state. The reference oil pressure P0 after the above correction is set as the standby oil pressure Pw. In this way, the oil pressure, which is applied to each corresponding drive piston 8 assigned to the corresponding friction arrangement, is held at the standby oil pressure Pw, as shown in FIG. 7.

Thereafter, at step S16, the gear shift ECU 36 determines whether the next gear shift should be executed. When YES is returned at step S16, the gear shift ECU 36 proceeds to step S17 and increases the oil pressure, which is applied to the drive piston 8 assigned to the corresponding standby friction arrangement, from the standby oil pressure Pw to an engagement holding oil pressure Ph, which is larger than the full engagement oil pressure Pb. Thus, each corresponding standby friction arrangement is placed in the fully engaged state for conducting the torque from the input shaft 6 to the output shaft 7, and the gear shift operation is completed.

As described above, in the AT control apparatus 10, the standby oil pressure Pw is applied to each corresponding drive piston 8 assigned to the corresponding standby friction arrangement in the standby state for implementing the next gear shift before the next gear shift takes place. The standby oil pressure Pw is set to the oil pressure, which is lower than the full engagement oil pressure Pb but is higher than the stroke start oil pressure Ps. That is, the standby oil pressure Pw is set to the oil pressure, which slides the drive piston 8 within the range that does not cause transmission of the torque in the corresponding friction arrangement. Thus, each corresponding piston chamber 9, which applies the oil pressure to the drive piston 8 assigned to the corresponding friction arrangement, is filled with the operating oil, and this drive piston 8 is slid to the point which is just before the enablement of the torque transmission in the corresponding friction arrangement by the drive piston 8. In this way, the slide distance (stroke distance) of the drive piston 8 between the initiation of the next gear shift and the achievement of the torque transmission of the standby friction arrangement upon the movement of the standby friction arrangement after the actual initiation of the next gear shift is shortened. In this way, the required engagement time of the standby friction arrangement in the next gear shift is shortened. Therefore, through use of the AT control apparatus 10, it is possible to improve the gear shift response by shortening the required gear shift time even when the rate of increase in the oil pressure per unit time applied to the friction arrangement in the engaging direction at the time of gear shift is minimized. As a result, the gear shift feeling of the driver or any other occupant is improved.

Furthermore, in the AT control apparatus 10, when the overshoot phenomenon in the oil pressure applied to the drive piston 8 is sensed just before the implementation of the full engagement oil pressure Pb upon increasing of the oil pressure applied to the drive piston 8 assigned to the corresponding friction arrangement, the further increase in the applied oil pressure is stopped to maintain the standby oil pressure Pw. Furthermore, this standby oil pressure Pw is obtained by correcting the reference oil pressure P0, which is used as the oil pressure for sensing the overshoot phenomenon. Specifically, the reference oil pressure P0 is corrected to the oil pressure within the torque non-conducting range of the standby friction arrangement, which is lower than the full engagement oil pressure Pb, based on the sensed temperature of the lubricant oil of the standby friction arrangement. Thus, it is possible to effectively limit the occurrence of the torque transmission through each corresponding standby friction arrangement before the next gear shift takes place, and therefore the high gear shift response can be implemented.

Furthermore, through use of the AT control apparatus 10, the next gear shift is predicted in advance based on the various types of vehicle related information generally used in the gear shift control, so that the accuracy of the prediction of the next gear shift is relatively high. Furthermore, each corresponding standby friction arrangement is selected based on the result of this prediction, so that the accuracy of this selection is also relatively high.

In the present embodiment, the gear shift ECU 36 corresponds to a selecting means and a predicting means of the present invention. The solenoid valves 22a-22e, the pressure control valves 28a-28e and the gear shift ECU 36 correspond to an applying means of the present invention. Furthermore, the oil pressure sensors 30a-30e correspond to a sensing means of the present invention. The standby oil pressure Pw corresponds to a standby fluid pressure of the present invention, and the reference oil pressure P0 corresponds to a reference fluid pressure of the present invention.

The one embodiment of the present invention has been described. However, the present invention is not limited to the above embodiment.

For example, in the above embodiment, the present invention is applied in the control apparatus 10 of the AT 1 that has the steering-wheel shift switch. However, the present invention is also equally applicable in a control apparatus of an AT of a floorshift type, which implements functions similar to those of the steering-wheel shift type. Further alternatively, the present invention is also applicable to a control apparatus of an AT of a type other than the floorshift type and the steering shift type.

Furthermore, in the above embodiment, the present invention is applied in the control apparatus 10 of the AT 1, which includes the five friction arrangements 2a-2e and the five drive arrangements 3a-3e. However, the present invention is not limited to this. That is, the present invention is applicable to a control apparatus of an appropriate AT as long as the AT has a plurality of friction arrangements and a plurality of drive arrangements.

Furthermore, in the above embodiment, the drive piston 8 of each drive arrangement 3a-3e receives the oil pressure, which is adjusted by the corresponding pressure control valve 28a-28e based on the output pressure (the command pressure) of the corresponding solenoid valve 20a-20e. Alternatively, the pressure control valves 28a-28e may be eliminated, and the output pressure of each solenoid valve 20a-20e may be directly applied to the piston 8 of the corresponding drive arrangement 3a-3e. In such a case, the solenoid valves 22a-22e and the gear shift ECU 36 correspond to the applying means of the present invention.

Furthermore, in the above embodiment, the oil pressure applied to the drive piston 8 assigned to the corresponding standby friction arrangement is held at the standby oil pressure Pw in the case where the overshoot phenomenon is sensed in the oil pressure applied to the drive piston 8 assigned to the standby friction arrangement. Alternatively, the timing for holding the applied oil pressure at the standby oil pressure Pw may be sensed based on the amount of slide movement (the amount of stroke) of the drive piston 8 assigned to the corresponding standby friction arrangement. Further alternatively, a vibration generated at the time of engagement of the drive piston 8 to the corresponding standby friction arrangement may be sensed through, for example, a G sensor, and this sensed timing of the vibration may be used as the timing for holding the applied oil pressure at the standby oil pressure Pw. In these cases, a damper for limiting the oil pressure pulsation (the oil pressure surge) may be provided in each oil passage 17a-17e between the corresponding pressure control valve 28a-28e and the corresponding drive arrangement 3a-3e and in each oil passage 16a-16e between the corresponding pressure control valve 28a-28e and the corresponding solenoid valve 22a-22e.

In addition, in the above embodiment, the reference oil pressure P0, which is the measured oil pressure at the time of sensing the overshoot phenomenon, is corrected to obtain the standby oil pressure Pw based on the sensed temperature of the lubricant oil of the standby friction arrangement. Alternatively, the reference oil pressure P0 may be directly used as the standby oil pressure Pw without correcting the reference oil pressure P0.

Additional advantages and modifications will readily occur to those skilled in the art. The invention in its broader terms is therefore not limited to the specific details, representative apparatus, and illustrative examples shown and described.

What is claimed is:

1. An automatic transmission control apparatus, which controls engagement and disengagement of each corresponding one of a plurality of friction arrangements of an automatic transmission of a vehicle by controlling application of a fluid pressure of operating fluid to a corresponding one of a plurality of drive pistons, which are assigned to and drive the plurality of friction arrangements, respectively, the automatic transmission control apparatus comprising:

a selecting means for selecting each corresponding one of the plurality of friction arrangements, which is driven in an engaging direction to achieve the engagement at time of next gear shift to transmit torque, as a standby friction arrangement that is placed in a standby state for implementing the next gear shift; and an applying means for applying a standby fluid pressure to each corresponding one of the plurality of drive pistons, which drives the corresponding standby friction arrangement, before the next gear shift, wherein the standby fluid pressure is for sliding each corresponding one of the plurality of drive pistons, which drives the corresponding standby friction arrangement, within a range that does not cause transmission of the torque through the corresponding standby friction arrangement.

2. The automatic transmission control apparatus according to claim 1, further comprising a sensing means for sensing each applied fluid pressure, which is applied to the corresponding drive piston assigned to the corresponding standby friction arrangement, wherein the applying means adjusts the standby fluid pressure based on a sensed fluid pressure of the sensing means.

3. The automatic transmission control apparatus according to claim 2, wherein:
the applying means increases the applied fluid pressure until an overshoot phenomenon is detected in the sensed fluid pressure, which is sensed by the sensing means; and
when the overshoot phenomenon is detected, the applying means holds and sets the applied fluid pressure as the standby fluid pressure.

4. The automatic transmission control apparatus according to claim 3, wherein:
the applying means sets the sensed fluid pressure, which is sensed at the time of detecting the overshoot phenomenon, as a reference fluid pressure; and
the applying means corrects the reference fluid pressure based on a temperature of lubricant fluid, which lubricates the corresponding standby friction arrangement, and sets the corrected reference fluid pressure as the standby fluid pressure.

5. The automatic transmission control apparatus according to claim 3, wherein the applying means determines that the overshoot phenomenon is detected when a rate of increase in the sensed fluid pressure per unit time becomes equal to or greater than a threshold value.

6. The automatic transmission control apparatus according to claim 1, further comprising a predicting means for predicting the next gear shift based on vehicle related information, wherein the selecting means selects each corresponding friction arrangement, which is driven in the engaging direction and transmits the torque at the next gear shift that is predicted by the predicting means, as the standby friction arrangement.

7. The automatic transmission control apparatus according to claim 6, wherein the vehicle related information includes at least one of:
vehicle state information that indicates a state of the vehicle;
environmental state information that indicates a state of a drive environment of the vehicle; and
vehicle maneuver tendency information that indicates vehicle maneuver tendency of a driver of the vehicle.

* * * * *